US012404969B1

(12) United States Patent
Bari

(10) Patent No.: US 12,404,969 B1
(45) Date of Patent: Sep. 2, 2025

(54) BRACKET DESIGN FOR RECREATIONAL VEHICLES

(71) Applicant: ZF CV Systems Global GmbH, Bern (CH)

(72) Inventor: Praful Bari, West Lafayette, IN (US)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 18/888,249

(22) Filed: Sep. 18, 2024

(51) Int. Cl.
B62D 1/16 (2006.01)
B62D 65/02 (2006.01)
F16M 13/02 (2006.01)

(52) U.S. Cl.
CPC ............. F16M 13/02 (2013.01); B62D 1/16 (2013.01); B62D 65/02 (2013.01)

(58) Field of Classification Search
CPC ............. B62D 1/16; B62D 65/02; B62D 1/02
See application file for complete search history.

(56) References Cited

U.S. PATENT DOCUMENTS 3,747,427 A * 7/1973 Milton .................... B62D 1/195
74/492
4,194,411 A * 3/1980 Manabe ................. B62D 1/195
188/376
4,452,096 A * 6/1984 Workman .............. B62D 1/195
280/779
4,884,778 A * 12/1989 Yamamoto ............. B62D 1/195
248/548
5,645,299 A * 7/1997 Dies ......................... B62D 1/16
280/779
5,819,592 A * 10/1998 Lewandowski ........ B62D 1/195
74/492
7,976,065 B2 * 7/2011 Domin ..................... B62D 1/16
280/779

FOREIGN PATENT DOCUMENTS

CN 218400733 U * 1/2023
GB 1482506 A * 8/1977 ............. B62D 1/195
KR 910004515 B1 * 7/1991 ............. B62D 1/195

* cited by examiner

Primary Examiner — Faye M Fleming
(74) Attorney, Agent, or Firm — LEYDIG, VOIT & MAYER, LTD.

(57) ABSTRACT

A steering system for a recreational vehicle (RV) includes a steering column and a sheet-metal bracket. The sheet-metal bracket has a central curved portion with a concave surface configured to receive a convex outer surface of a cylindrical portion of the steering column, and a first and second flange portions disposed on each side of the central curve portion. Each of the first and second flange portions have a plurality of through holes and a plurality of gussets. The plurality of gussets provide rigidity between each flange portion and the central curved portion. The concave curved surface of the bracket is disposed against the convex outer surface of the cylindrical portion of the steering column, and the bracket is fixedly attached to a chassis of the RV using at least two bolts passing through at least two through holes of the plurality of through holes.

19 Claims, 3 Drawing Sheets

BRACKET DESIGN FOR RECREATIONAL VEHICLES

FIELD

The present disclosure relates to a steering column for a recreational vehicle.

BACKGROUND

Steering assemblies of recreational vehicles (RV) are susceptible to large amounts of vibration during normal operation. As an RV travels on the road, the wheel assemblies of the RV may create vibrations that are transmitted from the wheels of the RV to the steering wheel via the output shaft, steering column, input shaft and the steering wheel assembly. Conventional RVs also have heavy torque overlay systems installed on the steering columns that amplify any vibrations generated in the steering column. The vibrations of the steering column of the RV lead to decreased steering performance of the RV and customer dissatisfaction.

SUMMARY

Embodiments of the present disclosure provide, in a first aspect, a steering system for a recreational vehicle, the steering system comprising: a steering column having a cylindrical portion that connects a first end of the steering column to a second end of the steering column, wherein the cylindrical portion of the steering column has a convex outer surface; and a sheet-metal bracket comprising: a central curved portion having a concave surface configured to receive the convex outer surface of the cylindrical portion; a first and second flange portions disposed on each side of the central curve portion, each of the first and second flange portions having a plurality of through holes and a plurality of gussets configured to provide rigidity between the each flange portion and the central curved portion, wherein the concave curved surface of the bracket is disposed against the convex outer surface of the cylindrical portion of the steering column, and wherein the bracket is fixedly attached to a chassis of the recreational vehicle using at least two bolts passing through at least two through holes of the plurality of through holes.

According to an implementation of the first aspect, the sheet-metal bracket is a stamped sheet-metal bracket.

According to an implementation of the first aspect, the bracket is fixedly attached to the chassis of the recreational vehicle by aligning the at least two through holes of the plurality of through holes with corresponding holes in the chassis of the recreational vehicle and inserting the at least two bolts into the corresponding holes in the chassis of the recreational vehicle.

According to an implementation of the first aspect, a first curvature of the concave surface of the central curved portion matches a second curvature of the convex outer surface.

According to an implementation of the first aspect, the central curved portion of the sheet-metal bracket partially surrounds the cylindrical portion of the steering column.

Embodiments of the present disclosure provide, in a second aspect, a method for stabilizing a steering system for a recreational vehicle, the method comprising: providing a steering column having a cylindrical portion that connects a first end of the steering column to a second end of the steering column, wherein the cylindrical portion of the steering column has a convex outer surface; and providing a sheet-metal bracket comprising a central curved portion having a concave surface, and a first and second flange portions disposed on each side of the central curve portion, each of the first and second flange portions having a plurality of through holes and a plurality of gussets configured to provide rigidity between the each flange portion and the central curved portion; disposing the concave curved surface of the bracket against the convex outer surface of the steering column; and fixedly attaching the bracket to a chassis of the recreational vehicle using at least two bolts inserted in at least two through holes of the plurality of through holes.

According to an implementation of the second aspect, the method further comprises stamping the sheet-metal bracket to create the plurality of gussets.

According to an implementation of the second aspect, the method fixedly attaches the bracket to the chassis of the recreational vehicle further comprises: aligning the at least two through holes of the plurality of through holes with corresponding holes in the chassis of the recreational vehicle; and inserting the at least two bolts through the at least two through holes of the plurality of through holes into the corresponding holes in the chassis of the recreational vehicle.

According to an implementation of the second aspect, a first curvature of the concave surface of the central curved portion matches a second curvature of the convex outer surface.

According to an implementation of the second aspect, the central curved portion of the sheet-metal bracket partially surrounds the cylindrical portion of the steering column.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Steering assemblies installed in recreational vehicles (RV) are susceptible to large amounts of vibration during normal operation. As an RV travels on the road, the wheel assemblies of the RV may create vibrations that are transmitted from the wheels of the RV to the steering wheel through the output shaft, steering column, input shaft and the steering wheel assembly. Conventional RVs may additionally have torque overlay systems installed on the steering columns. The weight of the torque overlay system amplifies any vibrations generated in the steering column. The vibrations of the steering column of the RV lead to decreased steering performance and potential customer dissatisfaction.

The present disclosure describes using a support bracket to support existing steering columns and minimize the vibrations generated in the existing steering columns. By installing a support bracket to the existing steering columns, the existing steering columns may be made more robust and provide superior performance and reliability in the operations of the RV.

Figure 1:
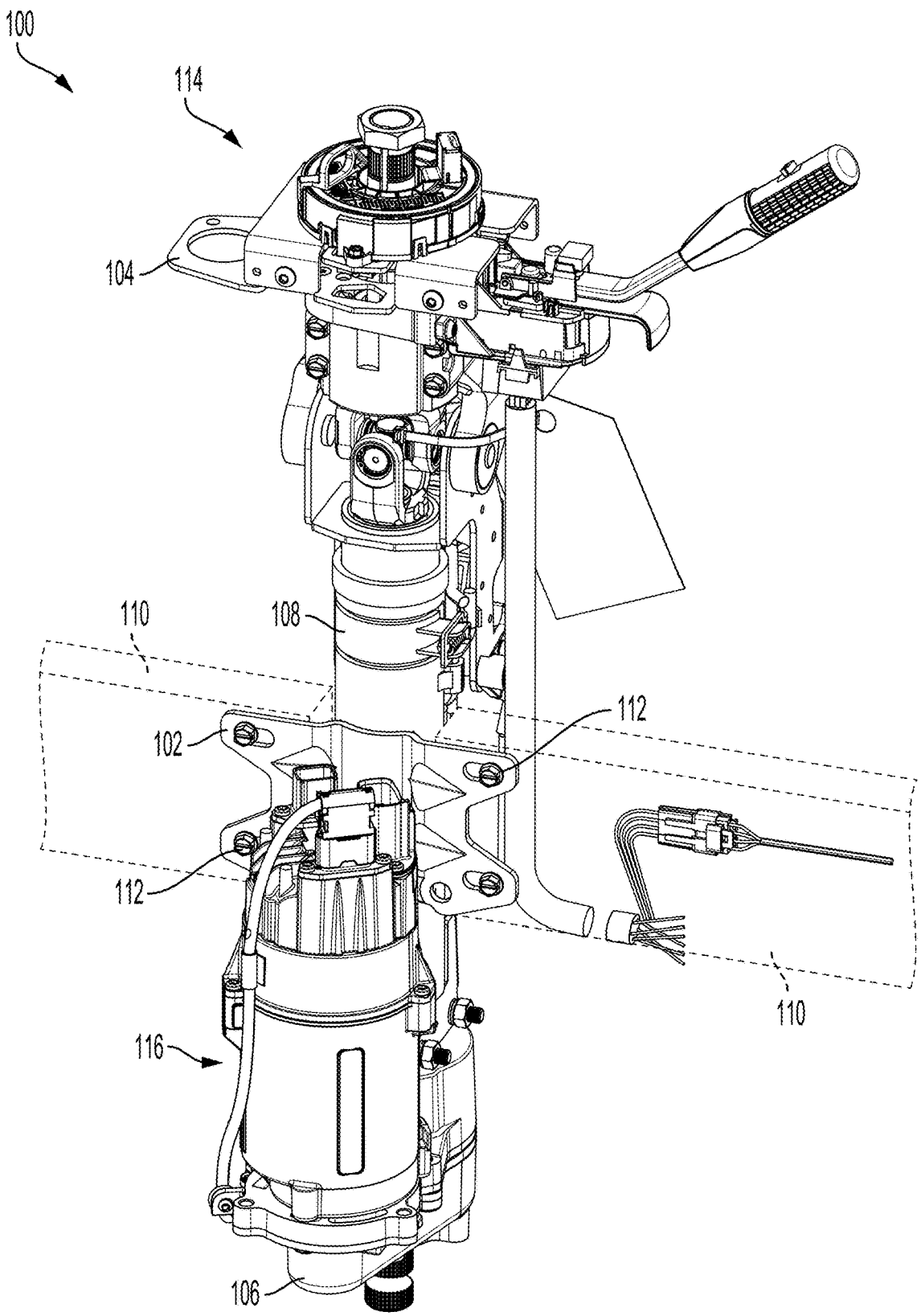
FIG. 1 illustrates a vertical perspective view of a steering column of a recreational vehicle (RV) with the support bracket, according to one or more examples of the present disclosure.

FIG. 1 illustrates a vertical perspective view of a steering column of a recreational vehicle (RV) with the support bracket, according to one or more examples of the present disclosure. FIG. 1 depicts the vertical perspective view 100 of the steering column 114. Steering column 114 includes a first portion 104, a second portion 106, and a cylindrical portion 108 that connects the first portion 104 of the steering column 114 and the second portion 106 of the steering column 114. In some embodiments, the first portion 104 of the steering column 100 may be connected to a steering wheel assembly of the recreational vehicle. In some embodiments, the second portion 106 of the steering column 106 may be connected to a steering gear. The steering gear may be connected to a wheel assembly of the recreational vehicle. Steering commands generated by drivers at the steering wheel of the recreational vehicle may be conveyed to the wheel assemblies of the recreational vehicle via the cylindrical portion 108. In some cases, an outer surface of the cylindrical portion 108 of the steering column 114 curves at a first curvature.

As the recreational vehicle is in operation, vibrations are generated in the wheel assemblies of the RVs. The vibrations generated in the wheel assemblies of the RV are transmitted through the second portion 106 of the steering column 114, via the cylindrical portion 108 of the steering column 114 to the first portion 104 of the steering column 114. In some embodiments, the steering column 114 may have a torque overlay system 116 coupled to the cylindrical portion 108 of the steering column 114. The torque overlay system 116 may be heavy and may amplify the vibrations of the cylindrical portion 104 of the steering column 114.

A support bracket 102 may be used to reduce the vibrations of the steering column 114. In some embodiments, the support bracket 102 may be placed adjacent to the cylindrical portion 108 of the steering column 114. For example, a concave curved surface of the support bracket 102 may be aligned with a convex outer surface of the cylindrical portion 108 of the steering column 114. In some cases, the curvature of the concave curved surface of the support bracket 102 may be the same as the convex curvature of the outer surface of the cylindrical portion 108 of the steering column 114.

The support bracket 102 may be held in place by using a plurality of bolts 112. The plurality of bolts 112 may be used to securely fasten the support bracket 102 to a chassis 110 of the RV. For example, the support bracket 102 may include a plurality of through holes that align with corresponding holes in the chassis 110 of the RV. The plurality of the bolts 112 may be inserted through the through holes of the support bracket 102 and the corresponding holes of the chassis 110 to hold the support bracket 102 in place.

In some embodiments, the concave curved surface of the support bracket 102 may partially surround the convex outer surface of the cylindrical portion 108 of the steering column 114. The support bracket 102, by aligning with the convex outer surface of the cylindrical portion 108 of the steering column 114, reduces the vibrations introduced in the steering column 114 during operation of the RV.

Figure 2:
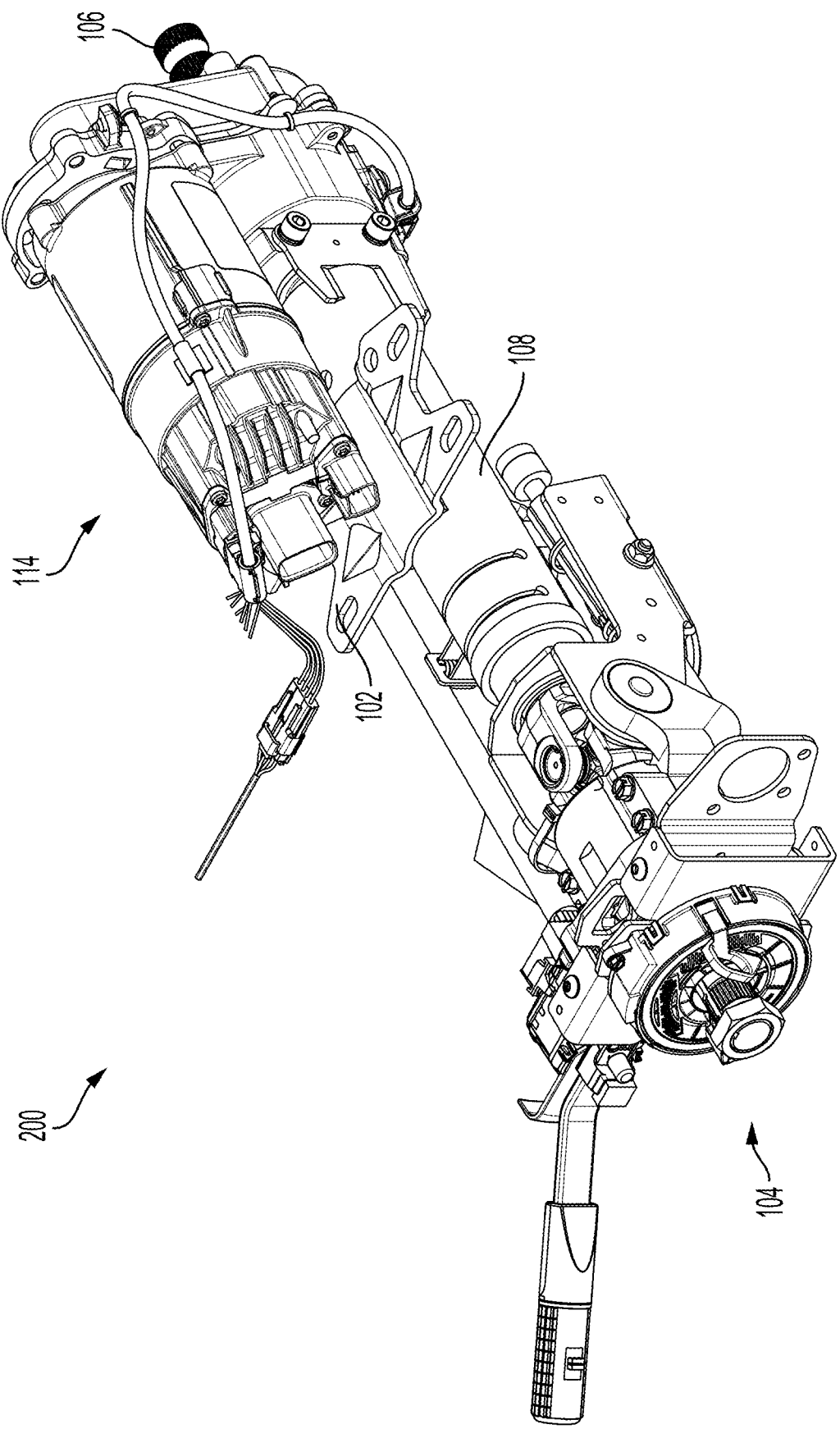
FIG. 2 illustrates a horizontal perspective view of the steering column of the RV with the support bracket, according to one or more examples of the present disclosure

FIG. 2 illustrates another perspective view of the steering column with the support bracket, according to one or more examples of the present disclosure. FIG. 2 depicts a horizontal perspective view 200 of the steering column 114. As seen in FIG. 2, a concave surface of the curved portion of the support bracket 102 is aligned with the convex outer surface of the cylindrical portion 108 of the steering column 114.

Figure 3:
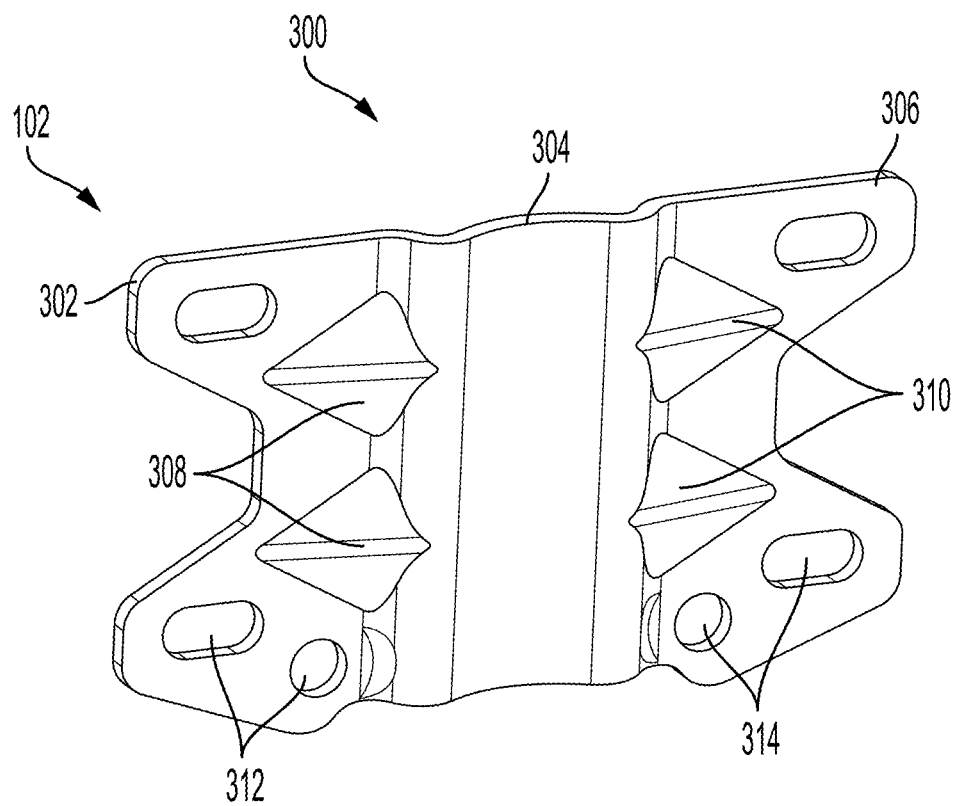
FIG. 3 illustrates a front perspective view of a support bracket, according to one or more examples of the present disclosure.

FIG. 3 illustrates a front perspective view of a support bracket, according to one or more examples of the present disclosure. FIG. 3 illustrates a front perspective view 300 of the support bracket 102. The support bracket 102 includes a first flange portion 302 and a second flange portion 306 that are placed on opposite sides of a central curved portion 304.

The central curved portion 304 includes a concave surface that is used to support a steering column. As described with respect to FIG. 1, the concave surface of the curved portion 304 of the support bracket 102 is aligned with the convex outer surface of the cylindrical portion 108 of the steering column 114 for extra support. For example, the concave surface of the central curved portion 304 may partially surround a portion of the outer convex surface of the cylindrical portion 108 of the steering column 114. In some embodiments, a curvature of the concave surface of the central curved portion 304 matches a curvature of a convex outer surface of the cylindrical portion 108 of the steering column 114.

The first flange portion 302 and the second flange portion 306 include a plurality of holes and a plurality of gussets. As shown in FIG. 3, the first flange portion 302 includes a plurality of gussets 308 and a plurality of through holes 312. In some embodiments, the plurality of gussets 308 are diamond-shaped or triangular-shaped raised portions of the first flange portion 302 of the support bracket 102. The plurality of gussets 308 are attached to the joint between the first flange portion 302 and the central curved portion 304. The use of the plurality of gussets 308 in the support bracket 102 strengthens the joint between the first flange portion 302 and the central curved portion 304.

Like the first flange portion 302, the second flange portion 306 also includes a plurality of holes and a plurality of gussets. The second flange portion 306 includes a plurality of gussets 310 and a plurality of through holes 314. The plurality of gussets 310 are diamond-shaped or triangular-shaped raised portions of the second flange portion 306 of the support bracket 102. The plurality of gussets 310 are attached to the joint between the second flange portion 306 and the central curved portion 304. The use of the plurality of gussets 310 in the support bracket 102 strengthens the joint between the second flange portion 306 and the central curved portion 304.

In some embodiments, the support bracket 102 is composed of stamped sheet-metal. In such cases, the plurality of gussets 308 in the first flange 302 and the plurality of gussets 310 in the second flange 306, may be formed by stamping the sheet-metal on one side. For example, by stamping the sheet-metal on one side, portions of the sheet metal may be raised on an opposite side, creating the plurality of gussets 308 and the plurality of gussets 310. The plurality of gussets 308 may then be attached to the joint between the first flange portion 302 the central curved portion 304, and the plurality of gussets 310 may be attached to the joint between the second flange portion 306 and the central curved portion 304 to provide rigidity to the respective joints.

In some embodiments, the plurality of through holes 312 and the plurality of through holes 314 may be of a combination of various different shapes. For example, as shown in FIG. 3, a particular hole of the plurality of through holes 312 may be circular shaped, while a second hole of the plurality of through holes 312 may be oval shaped. The different shapes of the holes of the plurality of through holes 312 and the plurality of through holes 314 may be used to align with corresponding holes in different chassis designs of different recreational vehicles. In this way, the design of the support bracket 102 is simultaneously compatible with chassis of many different recreational vehicles available. For example, a first subset of the plurality of through holes 312 and the plurality of through holes 314 may be used to align the support bracket with corresponding holes in a first chassis of a first recreational vehicle. A plurality of bolts may be inserted through the first subset of the plurality of through holes 312 and the plurality of through holes 314 and into the corresponding holes in the first chassis of the first recreational vehicle to hold the support bracket 102 in place with respect to the cylindrical portion 108 of the steering column 114.

Additionally and/or alternatively, a second subset of the plurality of through holes 312 and the plurality of through holes 314 may be used to align the support bracket with corresponding holes in a second chassis of a second recreational vehicle. A plurality of bolts may be inserted through the second subset of the plurality of through holes 312 and the plurality of through holes 314 and into the corresponding holes in the second chassis of the second recreational vehicle to hold the support bracket 102 in place with respect to the cylindrical portion 108 of the steering column 114.

Once locked in place, the support bracket 102 may minimize the vibrations of the steering column 114 that are caused during the normal operation of a recreational vehicle.

Figure 4:
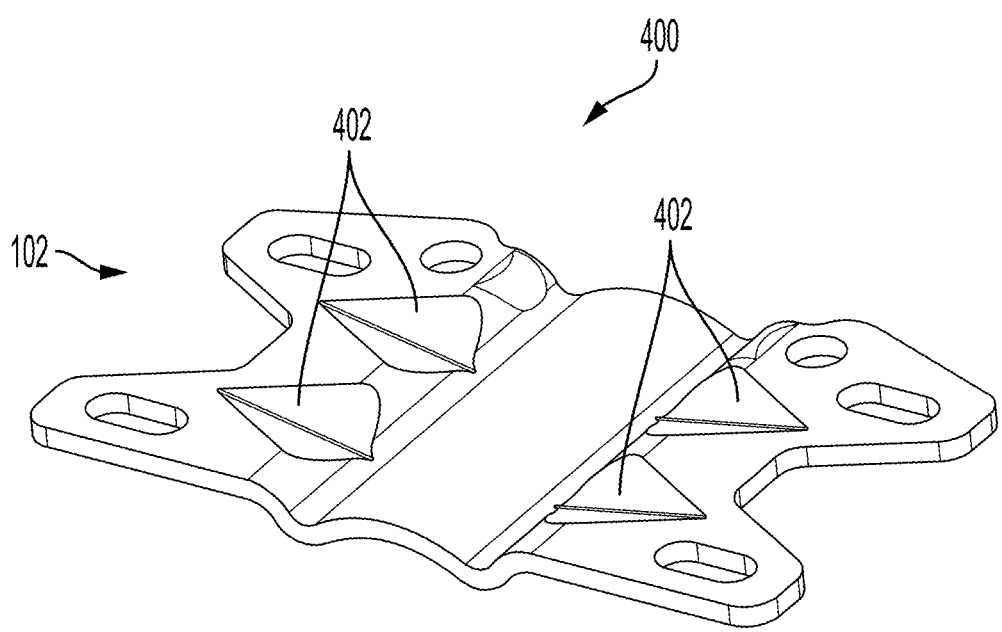
FIG. 4 illustrates rear perspective view of the support bracket, according to one or more examples of the present disclosure.

FIG. 4 illustrates a rear perspective view of the support bracket, according to one or more examples of the present disclosure. FIG. 4 illustrates a rear perspective view 400 of the support bracket 102. As discussed above, the support bracket 102 is composed of sheet-metal. The sheet-metal is stamped on one side to create the plurality of gussets 308 and 310. As shown in FIG. 4, the stamping of the sheet-metal creates depressions 402 on the side on which the sheet metal is stamped. On the flip-side of the sheet-metal, the plurality of gussets 308 and 310 are formed which are then attached to the joints between the first and second flange portions 302 and 306 and the central curved portion 304.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A steering system for a recreational vehicle, the steering system comprising:
 a steering column having a cylindrical portion that connects a first end of the steering column to a second end of the steering column, wherein the cylindrical portion of the steering column has a convex outer surface; and
 a sheet-metal bracket comprising:
  a central curved portion having a concave surface configured to receive the convex outer surface of the cylindrical portion;
  a first and second flange portion disposed on each side of the central curve portion, each of the first and second flange portions having a plurality of through holes and a plurality of gussets configured to provide rigidity between the each flange portion and the central curved portion,
 wherein each of the first and second flange portions includes a first protruding portion and a second protruding portion, the first and second protruding portions each being configured to extend away from the central curved portion to accommodate at least one of the plurality of through holes,
 wherein the first and second protruding portions of a respective flange portion of the first and second flange portions are arranged at opposing axial ends of the respective flange portion,
 wherein each of the first and second flange portions further includes a connecting portion between the first and second protruding portions, the connecting portions each having a smaller lateral extent relative to the central curved portion than a lateral extent of each of the first and second protruding portions relative to the central curved portion,
 wherein the concave curved surface of the bracket is disposed against the convex outer surface of the cylindrical portion of the steering column, and wherein the bracket is fixedly attached to a chassis of the recreational vehicle using at least two bolts passing through at least two through holes of the plurality of through holes.

2. The steering system of claim 1, wherein the sheet-metal bracket is a stamped sheet-metal bracket.

3. The steering system of claim 1, wherein the bracket is fixedly attached to the chassis of the recreational vehicle by aligning the at least two through holes of the plurality of through holes with corresponding holes in the chassis of the recreational vehicle and inserting the at least two bolts into the corresponding holes in the chassis of the recreational vehicle.

4. The steering system of claim 1, wherein a first curvature of the concave surface of the central curved portion matches a second curvature of the convex outer surface.

5. The steering system of claim 1, wherein the central curved portion of the sheet-metal bracket partially surrounds the cylindrical portion of the steering column.

6. A method for stabilizing a steering system for a recreational vehicle, the method comprising:
providing a steering column having a cylindrical portion that connects a first end of the steering column to a second end of the steering column, wherein the cylindrical portion of the steering column has a convex outer surface; and
providing a sheet-metal bracket comprising a central curved portion having a concave surface, and a first and second flange portion disposed on each side of the central curve portion, each of the first and second flange portions having a plurality of through holes and a plurality of gussets configured to provide rigidity between the each flange portion and the central curved portion,
wherein each of the first and second flange portions includes a first protruding portion and a second protruding portion, the first and second protruding portions each being configured to extend away from the central curved portion to accommodate at least one of the plurality of through holes,
wherein the first and second protruding portions of a respective flange portion of the first and second flange portions are arranged at opposing axial ends of the respective flange portion,
wherein each of the first and second flange portions further includes a connecting portion between the first and second protruding portions, the connecting portions each having a smaller lateral extent relative to the central curved portion than a lateral extent of each of the first and second protruding portions relative to the central curved portion;
disposing the concave curved surface of the bracket against the convex outer surface of the steering column; and
fixedly attaching the bracket to a chassis of the recreational vehicle by inserting at least four bolts through at least four through holes of the plurality of through holes such that at least one bolt is inserted into at least one through hole accommodated in each of the first and second protruding portions of the first and second flange portions.

7. The method of claim 6, further comprising stamping the sheet-metal bracket to create the plurality of gussets.

8. The method of claim 6, wherein fixedly attaching the bracket to the chassis of the recreational vehicle further comprises:
aligning the at least two through holes of the plurality of through holes with corresponding holes in the chassis of the recreational vehicle; and
inserting the at least two bolts through the at least two through holes of the plurality of through holes into the corresponding holes in the chassis of the recreational vehicle.

9. The method of claim 6, wherein a first curvature of the concave surface of the central curved portion matches a second curvature of the convex outer surface.

10. The method of claim 6, wherein the central curved portion of the sheet-metal bracket partially surrounds the cylindrical portion of the steering column.

11. The steering system of claim 1, wherein each connecting portion is arranged between two gussets.

12. The steering system of claim 11, wherein the first protruding portions collectively accommodate two through holes of the plurality of through holes, and wherein the second protruding portions collectively accommodate at least two further through holes of the plurality of through holes.

13. The steering system of claim 12, wherein the two through holes of the first protruding portions and the at least two through holes of the second protruding portions are identical.

14. The steering system of claim 13, wherein the identical through holes of the first protruding portions and the second protruding portions are each have a stadium-shaped profile.

15. The steering system of claim 12, wherein the second protruding portions collectively accommodate at least four further through holes of the plurality of through holes, two of the at least four further through holes having a different profile from other through holes of the at least four further through holes.

16. The steering system of claim 15, wherein two of the at least four further through holes of the second protruding portions each have a circular profile, and wherein two of the at least four further through holes of the second protruding portions each have a stadium-shaped profile.

17. The steering system of claim 16, wherein the two through holes of the first protruding portions are identical to the through holes of the second protruding portions having the stadium-shaped profile.

18. The steering system of claim 1, wherein the sheet-metal bracket has a first axial peripheral edge that is straight when viewed in a radial direction of the central curved portion, and wherein the first axial peripheral edge is formed by the central curved portion and the first protruding portions of each of the first and second flange portions.

19. The steering system of claim 18, wherein the sheet-metal bracket has a second axial peripheral edge that is non-linear when viewed in a radial direction of the central curved portion, the second axial peripheral edge being opposite the first axial peripheral edge.

* * * * *